US012222436B2

(12) United States Patent
Gulden et al.

(10) Patent No.: US 12,222,436 B2
(45) Date of Patent: Feb. 11, 2025

(54) RADAR METHOD AND RADAR SYSTEM

(71) Applicant: SYMEO GMBH, Neubiberg (DE)

(72) Inventors: Peter Gulden, Erding (DE); Martin Vossiek, Furth (DE); Michael Gottinger, Buckenhof (DE)

(73) Assignee: Symeo GmbH, Neubiberg (DE)

( * ) Notice: Subject to any disclaimer, the term of this patent is extended or adjusted under 35 U.S.C. 154(b) by 208 days.

(21) Appl. No.: 17/641,729

(22) PCT Filed: Aug. 11, 2020

(86) PCT No.: PCT/EP2020/072497
§ 371 (c)(1),
(2) Date: Mar. 9, 2022

(87) PCT Pub. No.: WO2021/047844
PCT Pub. Date: Mar. 18, 2021

(65) Prior Publication Data
US 2022/0334217 A1  Oct. 20, 2022

(30) Foreign Application Priority Data
Sep. 9, 2019 (DE) .......................... 102019124120.0

(51) Int. Cl.
*G01S 7/02* (2006.01)
*G01S 7/35* (2006.01)

(52) U.S. Cl.
CPC .............. *G01S 7/023* (2013.01); *G01S 7/352* (2013.01)

(58) Field of Classification Search
CPC . G01S 13/42; G01S 7/03; G01S 7/023; G01S 7/35; G01S 13/003; G01S 13/87; G01S 7/4017; G01S 13/34; G01S 7/352
See application file for complete search history.

(56) References Cited

U.S. PATENT DOCUMENTS 5,412,414 A  5/1995 Ast et al.
11,016,169 B2  5/2021 Vossiek et al.

OTHER PUBLICATIONS

European Patent Office, International Search Report and Written Opinion for PCT/EP2020/072497, Nov. 25, 2020, 10 pages.
Gottinger, et al., Coherent Full-Duplex Double-Sided Two-Way Ranging and Velocity Measurement Between Separate Incoherent Radio Units, IEEE Transactions on Microwave Theory and Techniques. Mar. 22, 2019, pp. 2045-2061, vol. 67, No. 5.

*Primary Examiner* — An H Do
(74) *Attorney, Agent, or Firm* — Schwegman Lundberg & Woessner, P.A.

(57) ABSTRACT

A radar method comprising transmitting and receiving signals simultaneously or overlapping in time by spatially separated transceiver units. Comparison signals are formed from transmitted and received signals by respective transceiver units. A phase correction is formed for each of a plurality of sample values, to generate a measure of phase difference per sample value between the comparison signals. A measure of phase difference is used to improve accuracy of distance or velocity measurements between the transceiver units. A radar system includes transceiver units and an evaluation unit configured to perform the method.

20 Claims, 5 Drawing Sheets

RADAR METHOD AND RADAR SYSTEM

CROSS REFERENCE TO RELATED APPLICATIONS

This application is the U.S. National Stage Application, filed under 35 U.S.C. 371, of International Patent Application No. PCT/EP2020/072497, entitled RADAR METHOD AND RADAR SYSTEM, filed on Aug. 11, 2020, which claims the benefit of German Patent Application No. 10 2019 124 120.0 filed Sep. 9, 2019. The entire contents of each of which are incorporated by reference in their entirety.

DESCRIPTION

The invention relates to a radar method and a radar system, in particular a primary radar method and a primary radar system.

Radar systems, in particular radar systems having distributed radar units without distributed common high-frequency carrier signal for transmitting and receiving are fundamentally known. These spatially distributed arrangements can be used, for example, as a locating system or radiolocation system for estimating the position of the other or at least one further active radar unit, for acquiring or detecting the surroundings, thus of passive objects, persons, etc. (referred to in general as a passive radar target), or for remote sensing or earth observation.

However, without further steps it is not possible in principle using such an arrangement to carry out a coherent measurement, thus to use items of information which are dependent on the phasing of the measured signals. This information permits, for example, the estimation of a velocity, an accurate position, or an angle using the phase values of all radar units. Furthermore, the influence of phase noise is significantly higher due to the incoherent local oscillators than in homodyne radar systems, by which the accuracy of a distance measurement is significantly worsened.

Known arrangements comprise at least two spatially separated, non-coherent transceiver units (NCT, used synonymously with station "S" hereinafter, or referred to synonymously as a radar unit), which each contain a separate local oscillator as a clock source. The following description is based on [Pat2] or [Pat3], according to which data which were sampled after a mixing process by an analog-to-digital converter (ADC) are transferred from one to the other unit (at least two radar units are presumed here) and errors occurring in the synchronization are compensated for.

Different steps in the signal processing can be carried out for this purpose, depending on whether the clock rate of both local oscillators was equalized beforehand, or there is a certain drift [1]. In this case, both units transmit and receive at the same time via the same (or approximately the same), reciprocal (or quasi-reciprocal) radio channel in the full-duplex method, because of which the influence of interference variables (phase noises, nonlinearities, time offset, and unknown starting phases) of the sampled baseband signals is strongly correlated [Pat2] and [Pat3], or has the opposing effect and can be corrected [Pat1].

Radiolocation by means of radar technology differs from environment detection and remote sensing in that preferably the transmission parameters of a single line of sight connection (LOS) are ascertained. The signal level to be expected is very high in particular at short distances, for example in buildings, since at least one further active radar unit emits and the received power drops at a certain distance r with $1/r^2$. The goal of environment detection and radar remote sensing is the detection of passive radar targets which reflect the emitted electromagnetic waves. The distance dependence of the power is described here via $1/r^4$. In general, a simplified assumption can be made about the target distribution, the number of targets, or the expected signal level. This relationship can be mathematically represented via the channel pulse response.

The multiplication of the sampled signals described in [Pat2] theoretically results in complete phase noise suppression, if only a single target or only a very dominant target is present. However, convolution of all target responses in the spectral range is rather disadvantageous here, which sometime precludes practical use. In [Pat1] and [Pat3-5], a small signal approximation is used to describe the phase noise, which is not always accurate in particular at high signal levels. Furthermore, the described linear offset can be problematic as soon as distributed antenna arrays according to [Pat4] or [Pat5] are used and multiple targets occur at different angles, which is a routine case in many practical applications. Due to the angle-dependent phase shift, cancellation can occur in this way and the target detection can be obstructed or prevented. Furthermore, for example, in safety functions in road traffic or in remote sensing, it cannot be assumed that a correction of the interference variables via an isolated signal path (thus via a point target isolated an angle and distance) is possible.

It is the object of the invention to achieve the best possible quality of usable signals (in particular a suppression of phase noise and nonlinearities), wherein the corresponding radar method or radar system is to be usable in the most efficient and versatile manner possible.

This object is achieved in particular by the features according to claim 1.

In particular, the object is achieved by a radar method, in particular a primary radar method, in which at least one first and at least one second transceiver unit, which are in particular spatially separated from one another, transmit and receive signals simultaneously or overlapping in time, wherein a respective comparison signal, in particular mixed signals $s_{1k,mix}(t)$ or $s_{2k,mix}(t)$ etc. (preferably $s_{1k,mix}(t)$ in the first transceiver unit and/or $s_{2k,mix}(t)$ in the second transceiver unit) are formed from a signal transmitted and received by the respective transceiver unit, wherein a phase correction is formed for each of a plurality of sample values, preferably a phase correction value for each of a plurality of sample values (or for each point in time t) from the comparison signals $s_{1k,mix}(t)$ or $s_{2k,mix}(t)$, in particular in such a way that, preferably by a mathematical operation, a measure is formed for one phase difference per sample value between the at least two signals $s_{1k,mix}(t)$ or $s_{2k,mix}(t)$.

A phase correction value function is particularly preferably formed, which maps a phase correction value for each of the plurality of sample values (or for each signal point in time t).

The method described hereinafter for estimating and suppressing phase noise in distributed radar units is advantageous over the prior art and in particular over [Pat1-5] in particular for one or more of the following reasons:
- The accuracy of the estimation of the interference variables is increased by incorporating the complete channel pulse response, thus the entire available information of the sampled signals.
- Since it is a comparatively accurate method, the achievable improvement of the quality of the useful signals, thus the suppression of phase noise and nonlinearities, is higher.

The function of the method can be ensured if necessary independently of the target distribution or a channel pulse response, which is advantageous in particular in the case of multiple targets or strong multipath propagation.

The method is comparatively processing efficient and simple, since no prior information is necessary, or no preselection/detection of targets has to be carried out.

The use of multichannel radars is facilitated, since the influence of phase noise on all channels is identical and can be compensated for using the calculated correction values.

Specifically, the method can be based on the method according to DE 10 2014 104 273 A.

In particular, a radar method is implemented, in which in a first, in particular noncoherent transceiver unit, a first signal is generated and transmitted via a path, in particular emitted, in a further, in particular second, in particular noncoherent transceiver unit, a first signal is generated and transmitted via the path, in particular emitted, in the first transceiver unit, a comparison signal is formed from its first signal and from such a first signal received from the further transceiver unit via the path, in the further transceiver unit, a further comparison signal is formed from its first signal and from such a first signal received from the first transceiver unit via the path, wherein the further comparison signal is transferred, in particular communicated, from the further transceiver unit to the first transceiver unit.

A corresponding path is in particular an air interface, via which the respective signals or comparison signals (mixed signals) can be transmitted or transferred and received by means of antennas.

Signals assigned to a corresponding transceiver unit and the further calculations, evaluations, or other method steps linked thereto, in particular the formation of the respective comparison signal (preferably mixed signal) can be carried out in the (respective) transceiver unit and/or in a (possibly physically independent, optionally spatially separated) evaluation device (evaluation unit), which is connected (for communication) to the (respective) transceiver unit.

For example, the (respective) transceiver unit can be formed as an arrangement made up in particular of one or more antennas with some (few) signal-generating or signal-processing components, wherein further components (for example signal comparison units or an evaluation device which can be connected to the evaluation unit as a structurally independent component on such an arrangement). If components are used, insofar as technically implementable, they can be designed as hardware made of processing components and/or as signal or data processing steps executed entirely or partially in a processor.

A signal received and transmitted by the respective transceiver unit is to be understood in particular as a signal which is transmitted from the respective (for example first) transceiver unit to another (for example second transceiver unit), wherein preferably the corresponding received signal is the signal originating from the other (for example second) transceiver unit. A first mixed signal is $s_{1k,mix}(t)$ preferably formed in the first transceiver unit. A second comparison signal, in particular mixed signal $s_{2k,mix}(t)$, is preferably formed in the second transceiver unit.

A phase correction is preferably formed for each of a plurality of sample values which are assigned to the corresponding comparison signal. A plurality of sample values can possibly be understood as a subset of all sample values (of a corresponding signal). A plurality of sample values can preferably be directly successive sample values which in particular form a subset of the sample values. The plurality preferably corresponds to at least 50%, more preferably at least 90%, still more preferably at least 99% of all sample values. A phase correction is particularly preferably carried out for all sample values.

In one preferred embodiment, a radar method is proposed, wherein to form a phase correction value function $y_k(t)$, a multiplication of the one signal $s_{1k,mix}(t)$ with the conjugated complex of the respective other signal $s_{2k,mix}(t)$ is carried out and/or the two signals $s_{1k,mix}(t)$ and $s_{2k,mix}(t)$ are represented according to absolute value and phase and the phases of the two signals are subtracted from one another for each sample value or for each point in time t. The multiplication in the time range can alternatively be implemented by a convolution in the frequency range.

In one preferred embodiment, a radar method is proposed, wherein the phase correction value function $y_k(t)$ is used to correct at least one of the sampled time signals $s_{1k,mix}(t)$, $s_{2k,mix}(t)$ (etc.), preferably in such a way that an expression is formed from the phase correction value function $y_k(t)$, preferably a function of complex numbers having constant amplitude and the phase $y_k(t)$, wherein this expression is then multiplied by the time signal $s_{1k,mix}(t)$, $s_{2k,mix}(t)$ (etc.) and thus one or more phase corrected signal(s) $s'_{1k,mix}(t)$, $s'_{2k,mix}(t)$ (etc.) are formed (cf. in particular equation (13)).

In one preferred embodiment, a radar method is proposed, wherein the signals (transmitted and received signals) are linear frequency-modulated signals (for example FMCW and/or LFM).

In one preferred embodiment, a radar method is proposed, wherein the at least two transceiver units have visual contact with one another.

In one preferred embodiment, a radar method is proposed, wherein the at least two transceiver units are configured for earth remote sensing and/or are attached to flying objects, which are in particular separate, preferably satellite(s) and/or airplane(s).

In one preferred embodiment, a radar method is proposed, wherein a phase error is estimated using baseband signals of at least one receiving channel and is compensated for in at least one further receiving channel.

In one preferred embodiment, a radar method is proposed, wherein at least one transceiver unit, preferably at least two and/or all transceiver units, uses a (respective) antenna element for the common transmitting and receiving.

The above-mentioned object is furthermore achieved in particular by a radar system, in particular a primary radar system, preferably for carrying out the method as claimed in any one of the preceding claims, comprising at least two transceiver units, which are in particular spatially separated, and which are configured to transmit and receive signals simultaneously or overlapping in time, wherein at least one evaluation unit of the radar system, preferably each one of the at least two transceiver units (S1, S2), is/are configured, in particular in each case, to form a comparison signal, preferably a mixed signal, from a signal $s_{1k,mix}(t)$ or $s_{2k,mix}(t)$ transmitted and received by the respective transceiver unit, wherein a phase correction is formed for each of a plurality of sample values, preferably a phase correction is formed for each of a plurality of sample values (or for each corresponding point in time t) from the comparison signals $s_{1k,mix}(t)$ or $s_{2k,mix}(t)$, in particular in such a way that a measure for the phase difference per sample value between the at least two signals $s_{1k,mix}(t)$ and $s_{2k,mix}(t)$ is formed, preferably by a mathematical operation.

In one preferred embodiment, the evaluation unit is configured, to form the phase correction function $y_k(t)$, to carry out a multiplication of the one signal $s_{1k,mix}(t)$ with the conjugated complex of the respective other signal $s_{2k,mix}(t)$ and/or to represent the two signals $s_{1k,mix}(t)$ or $s_{2k,mix}(t)$ according to absolute value and phase and to subtract the phases of the two signals from one another for each sample value or for each point in time t.

The evaluation unit (evaluation device) can form a physical unit or can be distributed over multiple physically independent subunits (for example distributed on the multiple transceiver units).

The radar system is preferably configured to implement the above method. In particular, the evaluation unit can be configured accordingly to carry out the method steps, in particular processing steps, mentioned in the above method.

An analog-to-digital converter can preferably be used to sample the respective comparison signal.

The above-mentioned object is furthermore achieved in particular by a use of a radar method of the above type and/or a radar system of the above type for radiolocation using at least two distributed transceiver units, which preferably have visual contact with one another, in particular for precise locating, preferably for measuring distances and/or displacements and/or velocities.

The above-mentioned object is furthermore achieved in particular by a use of a radar method of the above type and/or a radar system of the above type for environment detection using at least two distributed transceiver units, which are furthermore preferably used for detecting objects in the environment, in particular in road traffic or in airspace monitoring.

The above-mentioned object is furthermore achieved in particular by a use of a radar method of the above type and/or a radar system of the above type for remote sensing using at least two distributed transceiver units, in particular for earth remote sensing, which are preferably attached to separate satellites and/or airplanes.

The above-mentioned object is furthermore achieved in particular by a use of a radar method of the above type and/or a radar system of the above type for reducing a demand for signal generation, e.g., by means of phase-locked loop (PLL) or direct digital synthesis (DDS).

Further embodiments result from the dependent claims.

The invention is also described hereinafter with respect to further aspects or features on the basis of the appended figures. In the figures:

FIG. 1 shows a block diagram having a distributed radar system for environment detection, which comprises two spatially separated radar units (transceiver units). The radar units preferably each at least have a common channel for simultaneously transmitting and receiving signals (TRX1/2), thus in particular an antenna element, which is used for both purposes.

The separation of transmitted and received signal at the shared antenna is carried out by way of example here via a transmission mixer (M1/2). Alternatively, this can also be carried out via a suitable coupling structure or a circulator.

Moreover, at least one radar unit can have further channels for transmitting and/or receiving.

Furthermore, each radar unit preferably has a separate clock source (LO1/2), a separate phase-locked loop for generating a high-frequency signal (PLL1/2) and an analog-to-digital converter (ADC1/2) for sampling the down-mixed signals $s_{1k,mix}(t)$ and $s_{2k,mix}(t)$, which are preferably to be further processed advantageously according to the invention.

The subscript k indicates the number of the FMCW (frequency modulated continuous wave) chirp, wherein, for example, either only rising or falling ramps or alternately both rising and also following ramps can be used as a trip sequence [1]. Three passive radar targets (Z1-3) are shown by way of example, wherein the respective signal runtime can be specified by $\tau_m$ and the damping factor by $a_m$.

Figure 1:
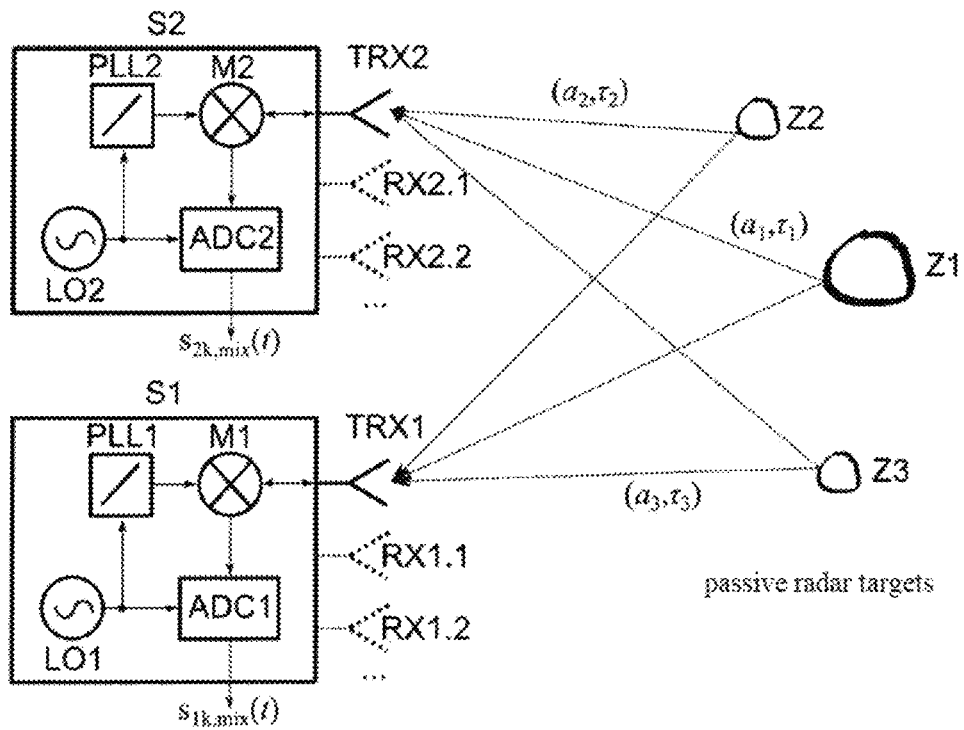
FIG. 1 shows two transceiver units communicating with one another and (passive) radar targets.
Figure 2:
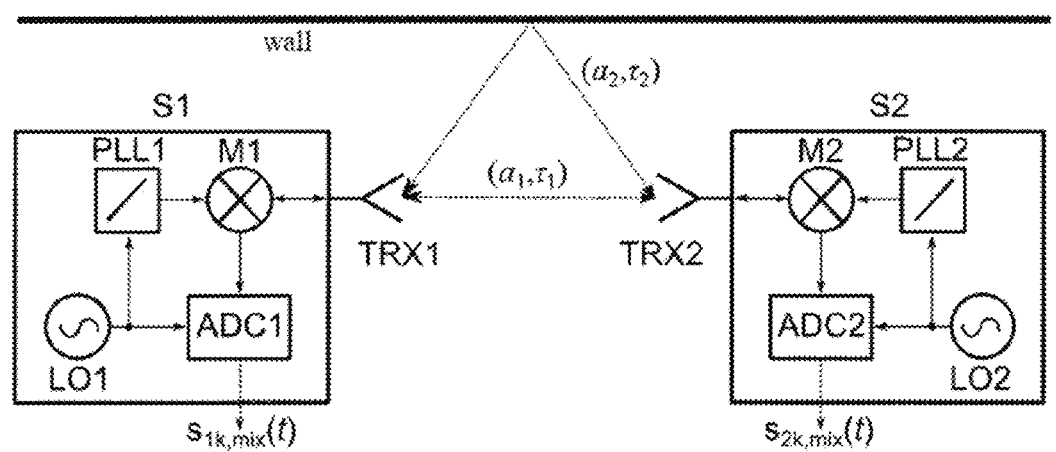
FIG. 2 shows a further illustration of two transceiver units according to the invention.

A system for radiolocation having two radar units is illustrated by way of example in FIG. 2, wherein the hardware components can be identical to those in FIG. 1. A direct transmission path exists here, thus a line of sight (LOS) between the two radar units, which generally represents the strongest transmission path and supplies the relevant items of information (for example distance from one another and velocity in relation to one another). In the present case, the radar units are located in the vicinity of a reflective wall, which can be the case, for example, when locating in buildings. Therefore, a second signal path exists, caused by the multipath propagation. An expansion of the radar units, for example, by multiple receiving channels, would also be possible here. This would have the advantage, for example, that the received power becomes greater, that interfering multipath propagation can be suppressed, and/or that in addition azimuth and/or elevation angles can be estimated for 2D or 3D locating.

Without restriction of the generality, the modeling is carried out for two radar units (transceiver units), where an analogous calculation can take place pair by pair in the case of more than two radar units. Preferably, each station has an antenna, which is used simultaneously for transmitting and receiving.

The transmission channel is preferably identical in both directions, thus behaves reciprocally.

The modulation of the transmitted and received signals by means of linear frequency modulation, referred to as FMCW or LFM (linear frequency modulation) is advantageous for this invention. This is advantageous due to the low demand on the hardware components and the simple assignment of signal components (for example separation of the signals from various radar units) in the spectrum.

In general, a transmission channel (cf. FIGS. 1 and 2), in particular an air transmission link, may be described by the channel pulse response $$h(t) = \sum_{m=0}^{M-1} a_m \delta(i - \tau_m) \quad (1)$$

wherein $a_m \in C$ (complex number range) and $T_m \in R$ (real number range) indicate the complex amplitude and the runtime via the signal path $m \in \{0, \ldots, M-1\}$. The expression $\delta(t)$ denotes the Dirac distribution. It is assumed for simplification that the signal duration of a chip is sufficiently short (for example less than 10 ms, preferably less than 1 ms and/or more than 10 μs, preferably more than 100 μs), thus the amplitude and the runtime are not subject to any relevant change during this time due to movement of radar targets or radar units. Thus, if a signal $s_{TX}(t)$ is transmitted via this channel, the received signal $s_{RX}(t)$ results via the convolution $$s_{RX}(t) = \int_{-\infty}^{\infty} s_{TX}(t') * h(t') dt' = \sum_{m=0}^{M-1} a_m s_{TX}(t - \tau_m). \tag{2}$$

the linear operator $*$ denotes the convolution in one dimension. The substantive matter represented in (2) indicates that the same signal is transmitted via M signal paths and received time-shifted and damped.

Using the signal model from [1] with (2), after a preliminary correction of the interference variables described herein, a mathematical model for the beat signals after the mixing process may be found. These can be modeled for station 1 and 2.

$$s_{1k,mix}(t) = \tag{3}$$
$$\sum_{m=0}^{M-1} a_m \exp\{j(2\pi f_m t + \varphi_{km} + \Psi_{1k}(t) - \Psi_{2k}(t - \tau_m) + \Theta_{1k} - \Theta_{2k})\} und$$

$$s_{2k,mix}(t) = \tag{4}$$
$$\sum_{m=0}^{M-1} a_m \exp\{j(2\pi f_m t + \varphi_{km} - \Psi_{1k}(t - \tau_m) + \Psi_{2k}(t) - \Theta_{1k} + \Theta_{2k})\}$$

wherein the occurring variables are described hereinafter. The runtime or the distance to radar targets can be calculated via the beat frequency $f_{in}$ (in the so-called "fast time") and the velocity can be calculated from multiple FMCW chirps (chirp sequence radar) via the phase shift $\varphi_{km}$ (in the so-called "slow time"). In systems having multiple receiving antennas, it is also via this phase value to determine the angle of incidence of an electromagnetic wave. In total, K FMCW chirps are transmitted and the chirp number is indicated by k. The phase noise (also nonlinearities) of station 1 and 2 is represented via the random variable via the random variables $\Psi_{1k}(t)$ and $\Psi_{2k}(t)$ and the unknown starting phases of the local oscillators via $\Theta_{1k}$ and $\Theta_{2k}$.

As is known from [1] or [Pat1] or [Pat3], the beat signals of the two stations are influenced approximately equally, or with opposite signs, by interference. The influence of phase noise in the fast time is thus correlated to a higher extent, since the runtime (often less than $\tau_m = 1$ μs) is very short. The typically occurring phase change (described over the power density spectrum) can therefore be assumed to be identical in absolute value in both mixed signals. The following applies $$\Psi_{PN,km}(t) := \Psi_{1k}(t) - \Psi_{2k}(t - \tau_m) \approx -(-\Psi_{1k}(t - \tau^m) + \Psi_{2k}(t)). \tag{5}$$

Furthermore, the received random sequence is independent in a good approximation from the distance to the targets, since the runtime difference is small in relation to the duration of a FMCW chirp. According to the prior art, the approximation $$\exp\{j\Psi_{PN,km}(t)\} \approx 1 + j\Psi_{PN,km}(t) \tag{6}$$

is used by terminating a Taylor development at the linear element. This can practically be insured, for example, via signal sources having sufficiently low phase noise.

After the estimation and correction of the unknown starting phases according to [Pat3], the signals in (3) and (4) can be represented with the relationship in (6) as $$s_{1k,mix}(t) = \sum_{m=0}^{M-1} a_m \exp\{j(2\pi f_m t + \varphi_{km})\}(1 + j\Psi_{PN,km}(t)) und \tag{7}$$

$$s_{2k,mix}(t) = \sum_{m=0}^{M-1} a_m \exp\{j(2\pi f_m t + \varphi_{km})\}(1 - j\Psi_{PN,km}(t)) \tag{8}$$

The interference component can be compensated for by a linear operation in the timer frequency range (by addition here) and the dynamic range of the useful signals can be enlarged.

Figure 3:
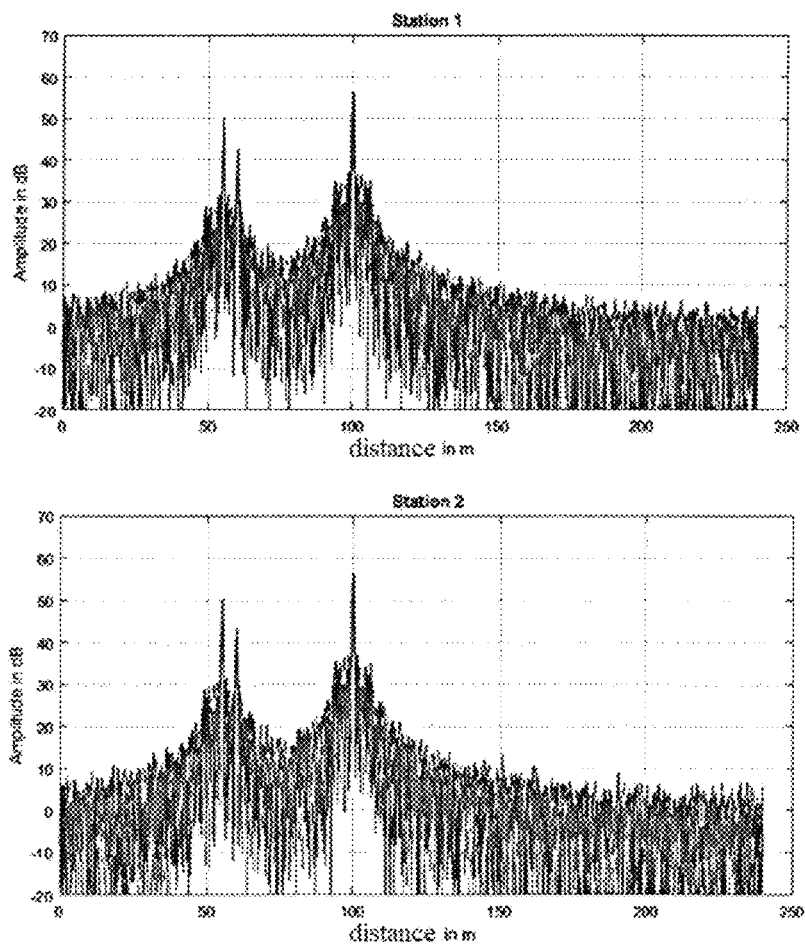
FIG. 3 shows an exemplary illustration of beat signals.
Figure 4:
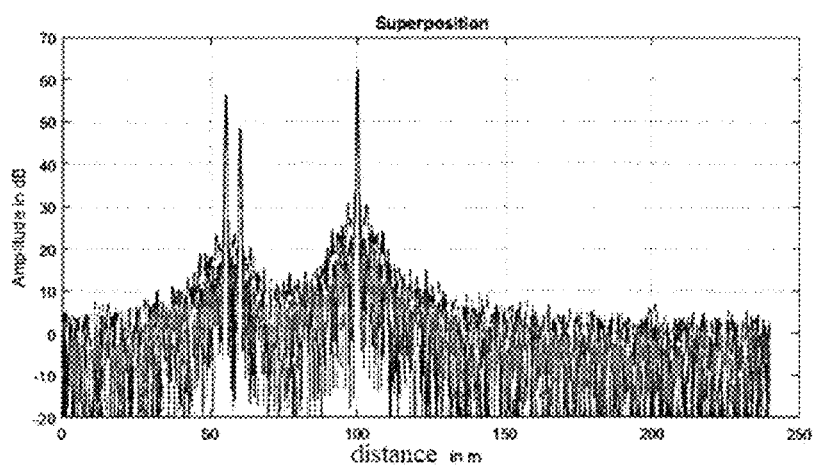
FIG. 4 shows an illustration of the superposition of beat signals of the transceiver units.
Figure 5:
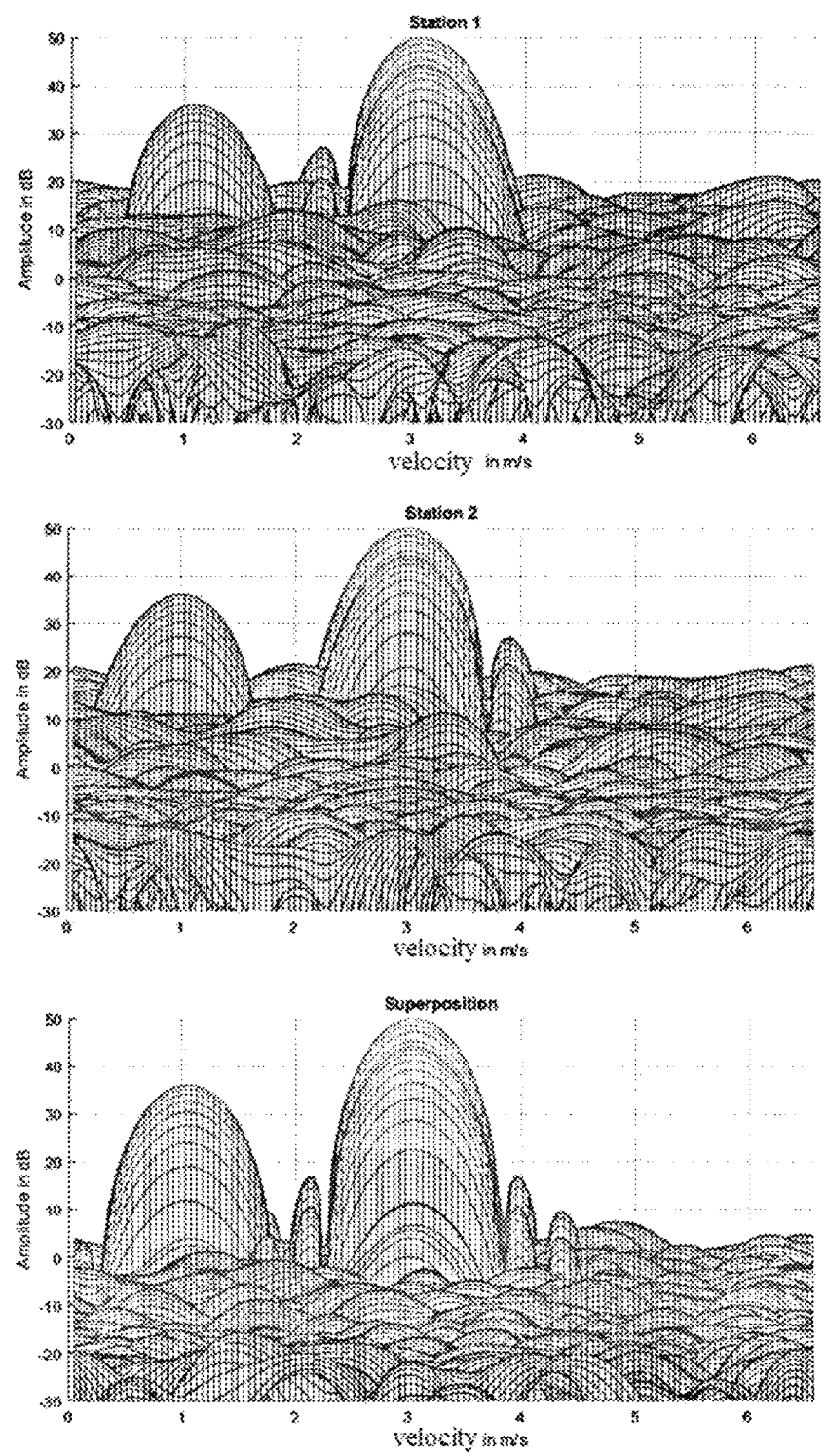
FIG. 5 shows an illustration of signals according to FIGS. 3 and 4 after a Fourier transform.

This method is shown by way of example using the signals from FIG. 3 in FIG. 4, by which a phase noise suppression of approximately 15 dB can be achieved. This step can also be applied in multiple dimensions, which is shown in FIG. 5 for the estimation of distance and velocity. The achievable improvement is predominantly dependent on how well the small signal approximation in (6) was maintained.

For an improvement of the phase noise suppression, first the property from (5) was applied to the time signals in (3) and (4), which resulted in $$s_{1k,mix}(t) = \exp\{j(\Psi_{PN,k}(t) + \Theta_k)\} \sum_{m=1}^{M-1} a_m \exp\{j(2\pi f_m t + \varphi_{km})\} \tag{9}$$
$$= \exp\{j(\Psi_{PN,k}(t) + \Theta_k)\} \cdot s_{0,k}(t) und$$

$$s_{2k,mix}(t) = \exp\{-j(\Psi_{PN,k}(t) + \Theta_k)\} \sum_{m=0}^{M-1} a_m \exp\{j(2\pi f_m t + \varphi_{km})\} \tag{10}$$
$$= \exp\{-j(\Psi_{PN,k}(t) + \Theta_k)\} \cdot s_{0,k}(t)$$

wherein $\Theta_k := \Theta_{1k} - \Theta_{2k}$ f is used for a simplified representation. It is apparent from this that all signal paths of the transmission channel are influenced similarly by the interference variables, which are before the sigma sign. The deterministic component of the signals in (9) and (10) was designated for clarity as $$s_{0,k}(t) = \sum_{m=0}^{M-1} a_m \exp\{j(2\pi f_m t + \varphi_{km})\} \tag{11}$$

and is identical in both radar stations.

Figure 6:
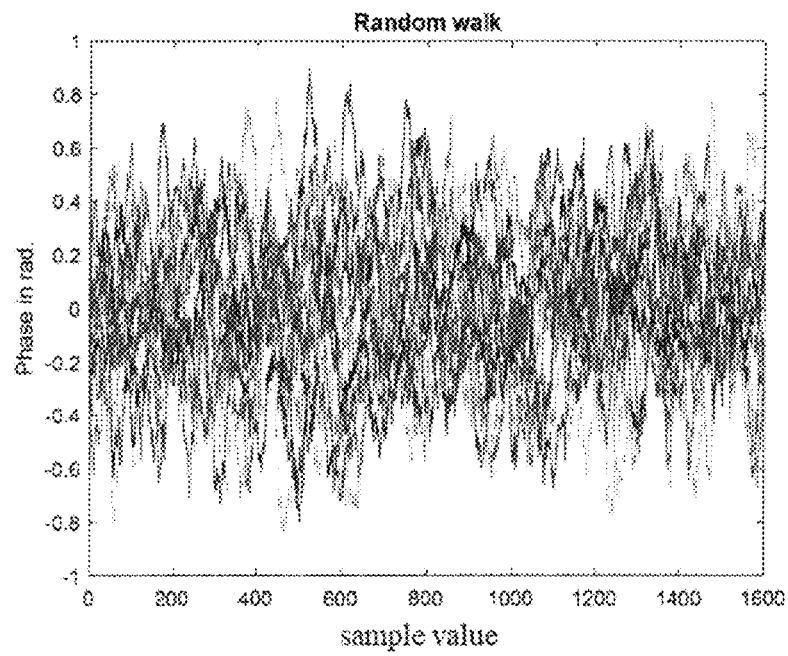
FIG. 6 shows an exemplary illustration of a phase interference of the signals according to FIGS. 3 and 4.

According to the invention, at this point there is a direct estimation of the interference variables (i.e., phase errors) per sample value (for each point in time t) for each FMCW chirp from the time signals via the operation $$\gamma_k(t) = \arg\{s_{1k,mix}(t) \cdot s^*_{2k,mix}(t)\}/2 \qquad (12)$$

$$= \arg\{\exp\{j2(\Psi_{PN,k}(t) + \Theta_k)\}|s_{0,k}(t)|^2\}/2$$

$$= \Psi_{PN,k}(t) + \Theta_k,$$

by which a phase correction operation (i.e. one phase correction value per sample value or for each signal point in time t) is formed. The operation arg {.}supplies the argument of a complex number. A higher level gain in relation to white noise is achieved here by $\|s_{0,k}(t)\|^2$. The division by 2 can result in phase jumps in the slow time, wherein a suitable method for correction is explained in [1]. If signal sources having comparatively high phase noise are used, this operation can also be used in the slow time. The result of this estimation is shown by way of example in FIG. 6, wherein the different colors can be assigned to the 64 chirps.

Figure 7:
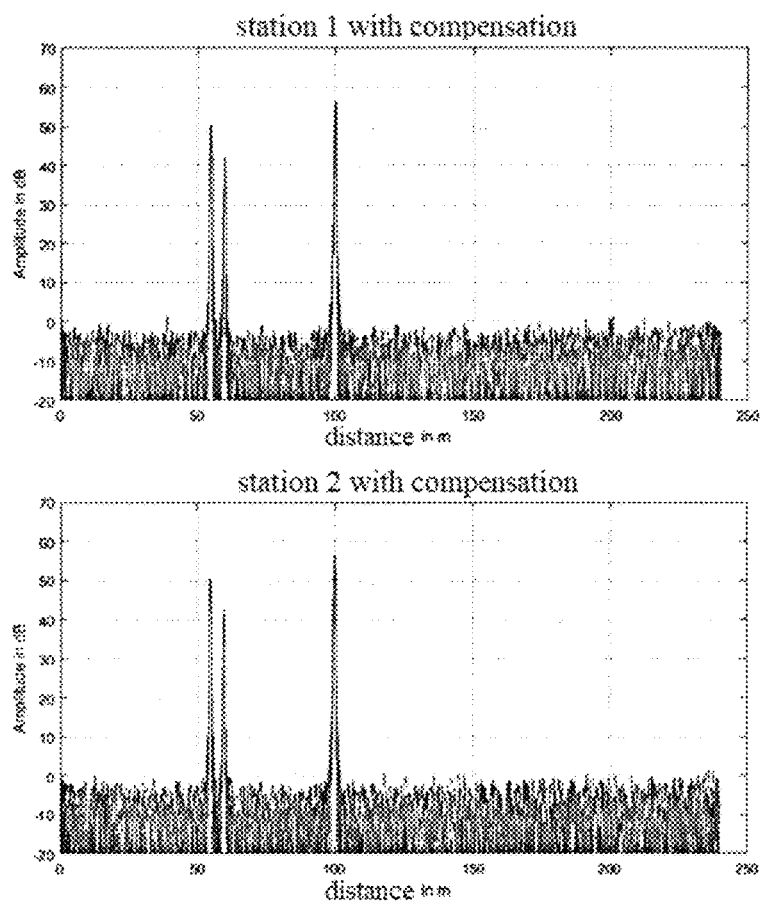
FIG. 7 shows beat signals after estimation of one phase interference per sample value.
Figure 8:
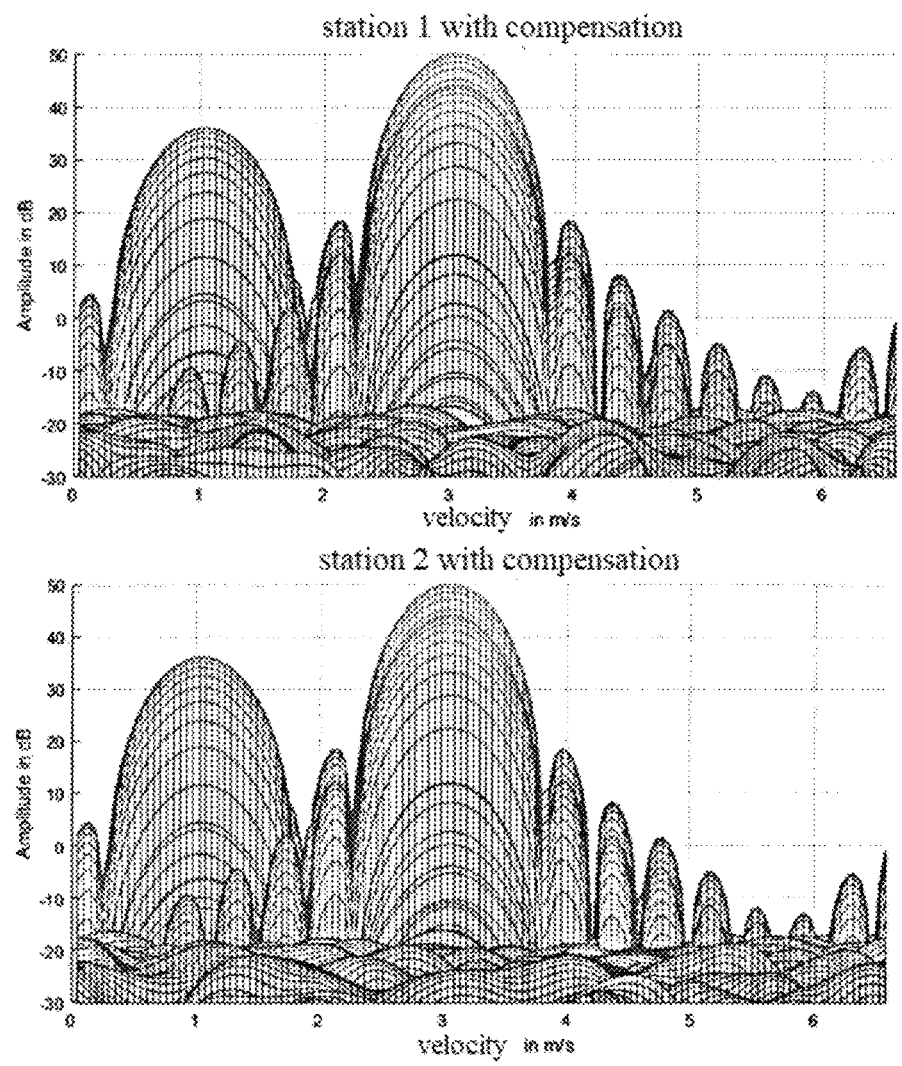
FIG. 8 shows an illustration of an improved phase noise suppression of the respective signals from FIGS. 3 and 4 including compensation.

The correction using the values from (12) can be calculated via the multiplication $$s_{1k,mix}(t)\exp\{-\gamma_k(t)\}s_{1k,mix}(t) = s_{0,k}(t) = \exp\{(\gamma_k(t)\}s_{2k,mix}(t) = s_{2k,mix}(t) \qquad (13)$$

wherein the resulting signals of both stations are identical if the estimation can be assumed to be ideal. The result of this method is graphically depicted in FIG. 7 (one-dimensionally) and FIG. 8 (two-dimensionally) and the resulting improvement of the dynamic range is approximately 40 dB.

In multichannel radars, the occurring interference in all receiving channels is (quasi) identical, since the runtime difference is very small. By means of (12), the interference can be ascertained, preferably via a channel having shared antenna for transmitting and receiving, and the correction can be applied to the time signals of all channels.

If alternatively only the unknown starting phase is to be ascertained, preferably a Fourier transform is carried out in the fast time, from which the beat spectra $$S_{1k,mix}(f) = F\{s_{1k,mix}(t)\} = \qquad (14)$$

$$\exp\{j\Theta_k\} \cdot F\{\exp\{j\Psi_{PN,k}(t)\}\} * \sum_{m=1}^{M-1} a_m \delta(f - f_m) \exp\{j\varphi_{km}\} und$$

$$S_{2k,mix}(f) = F\{s_{2k,mix}(t)\} = \qquad (15)$$

$$\exp\{-j\Theta_k\} \cdot F\{\exp\{-j\Psi_{PN,k}(t)\}\} * \sum_{m=0}^{M-1} a_m \delta(f - f_m) \exp\{j\varphi_{km}\}$$

result, wherein F {.}represents a Fourier transform.

Furthermore, window functions can be applied before the Fourier transform. These are not also incorporated here, since the calculation can be carried out independently thereof. The position of the maxima in (14) and (15) is only weakly influenced by phase noise, because of which $$S_{1k,mix}(f) \approx \exp\{j\Theta_k\} \sum_{m=0}^{M-1} a_m \delta(f - f_m) \exp\{j\varphi_{km}\} und \qquad (16)$$

$$S_{2k,mix}(f) = \exp\{-j\Theta_k\} \sum_{m=0}^{M-1} a_m \delta(f - f_m) \exp\{j\varphi_{km}\} \qquad (17)$$

approximately applies. Instead of the multiplication in the time range, the starting phases $\Sigma_k$ can also be determined via a multiplication of the existing signals in the frequency range, if no correction is to be carried out in the fast time.

The above-described method can be used for a high-accuracy locating system (having an accuracy in the range of 10 mm or better; or 1 mm or better), which profits from the improved phase noise suppression due to the high signal level. Furthermore, a displacement or the accurate distance can be produced by measuring the signal phase with significantly higher accuracy. In addition, the accuracy of a possible velocity estimation is improved. An expansion of the radar units by multiple receiving channels according to [2] is supported by the above-described method for multichannel systems for radiolocation.

This method can also be used for distributed MIMO (multiple-input multiple-output) radars for detecting passive radar targets (for example in the automotive field or for airspace monitoring). These systems can be operated coherently, which supplies additional items of information, such as bistatic or multistatic velocity, different observation perspectives, a vectorial velocity estimation, an item of height information by means of interferometry, or the improvement of resolution and accuracy of an angle measurement. Furthermore, the quality of an image of the environment by means of synthetic aperture radar (SAR) can be improved by an observation from multiple perspectives. With the present improved estimation of the phase interference, this can take place independently of the observed scenario and a suppression of this phase interference can be applied to all channels.

Typically, distributed SAR systems for remote sensing, for example of the Earth's surface, use at least two satellites [3]. At least one satellite emits signals which are reflected at passive radar targets and are received by the same satellite and at least one further satellite. Due to the separate transmitter and receiver, high-accuracy clock sources are preferably used in this application. In addition, a regular phase adjustment preferably takes place via a dedicated synchronization signal, which is transmitted between the satellites.

The present invention can advantageously be applied in such a way that a FMCW signal is simultaneously both transmitted between the satellites and used to "illuminate" a corresponding region (for example a defined region of the Earth's surface). This can be carried out, for example, via an antenna having suitable directional characteristic or preferably in each case via two antennas having suitable coupling structure connected upstream. The separation of the respective signals by suitable offsets in time or frequency is described in [1]. Due to the greatly differing runtime, a separation of the signals, which were transmitted directly and reflected from objects, is possible in the beat spectrum. Correction values can be ascertained by means of the phase curve of the directly transmitted signal. Phase interference of the signal can be corrected using these correction values, which is used for bistatic or multistatic Earth observation.

Summary of independent and refining aspects of the invention:
1) A method in which at least two spatially separated transceiver units transmit and receive and possibly mix signals simultaneously, wherein in each of the at least two transceiver units, a respective signal, $s_{1k,mix}(t)$ in the transceiver unit 1 or $s_{2k,mix}(t)$ in the transceiver unit 2, etc., is formed, characterized in that one phase correction value function $y_k(t)$ per sample value (for each point in time t) is formed from the time signals $s_{1k,mix}(t)$ or $s_{2k,mix}(t)$ in such a way that a measure of the phase difference per sample value between the at least two signals $s_{1k,mix}(t)$ and $s_{2k,mix}(t)$ is formed by a mathematical operation.

2) The method according to aspect 1)
wherein to form this phase correction value function $y_k(t)$, preferably either a multiplication of the one signal with the conjugated complex of the respective other signal is carried out or the two signals are represented according to absolute value and phase and the phases of the two signals are subtracted from one another for each sample value or for each point in time t.
3) The method according to 1), in which the phase correction value function $y_k(t)$ is used to correct at least one of the sampled time signals $s_{1k,mix}(t)$, $s_{2k,mix}(t)$, etc. preferably in such a way that an expression is formed from the phase correction value function $y_k(t)$, preferably a function of complex numbers having constant amplitude and the phase $y_k(t)$, wherein this expression is then multiplied by the time signal $s_{1k,mix}(t)$, $s_{2k,mix}(t)$, etc. and thus one or more phase-corrected signals $s_{1k,mix}(t)$, $s_{2k,mix}(t)$, etc. are formed (cf. equation 13)).
4) The method and device according to 1) using linear frequency-modulated (FMCW/LFM) transmitted and received signals.
5) The device according to 1) for radiolocation using at least two distributed radar units, which preferably have visual contact with one another, for precise locating, thus the measurement of distances and/or displacement and/or velocities.
6) The device according to 1) for environment detection using at least two distributed radar units, which are used for detecting objects in the environment, in particular in road traffic or in airspace monitoring.
7) The device according to 1) having at least two distributed radar units for remote sensing, in particular for earth remote sensing, which are preferably attached to separate satellite and/or airplanes.
8) The device and method according to 1) for distributed radar units having an antenna array, consisting of multiple receiving antennas, in which the phase error is estimated using the baseband signals of at least one receiving channel and is compensated for in at least one further receiving channel.
9) The device according to 1) which uses one antenna element for the common transmitting and receiving in at least one radar unit.
10) The device according to 1) which is used to reduce the demand on the signal generation, for example, by means of phase-locked loop (PLL) or direct digital synthesis (DDS).

CITED PATENT LITERATURE

[Pat1] WO 2010/019975 A1.
[Pat2] DE 10 2014 104 273 A1.
[Pat3] WO 2017/118621 A1.
[Pat4] WO 2018/158281 A1.
[Pat5] WO 2018/158173 A1.

FURTHER CITED LITERATURE

[1] M. Gottinger, F. Kirsch, P. Gulden, and M. Vossiek, "Coherent Full-Duplex Double-Sided Two-Way Ranging and Velocity Measurement Between Separate Incoherent Radio Units," IEEE Trans. Microw. Theory Tech., vol. 67, no. 5, pp. 2045-2061, 2019.
[2] R. Feger, C. Pfeffer, W. Scheiblhofer, C. M. Schmid, M. J. Lang, and A. Stelzer, "A 77-GHz Cooperative Radar System Based on Multi-Channel FMCW Stations for Local Positioning Applications," IEEE Trans. Microw. Theory Tech., vol. 61, no. 1, pp. 676-684, 2013.
[3] G. Krieger et al., "TanDEM-X: A Satellite Formation for High-Resolution Radar Interferometry," IEEE Trans. Geosci. Remote Sens., vol. 45, no. 11, pp. 3317-3341, 2007.

The invention claimed is:

1. A radar method, comprising: transmitting and receiving signals, simultaneously or overlapping in time, by at least two transceiver units that spatially separated from one another;
forming respective comparison signals comprising mixed signals, the mixed signals respectively formed from a signal transmitted and received by a respective transceiver unit amongst the at least two transceiver units;
forming a phase correction for each of a plurality of time sample values, comprising a phase correction value for each of a plurality of time sample values from the mixed signals, to generate a measure of a phase difference per time sample value between the mixed signals; and
using the phase correction to improve accuracy of at least one of a distance measurement or a velocity measurement between the at least two transceiver units.

2. The method of claim 1, wherein forming the phase correction comprises multiplying one mixed signal with a complex-valued conjugate of another mixed signal.

3. The method of claim 1, wherein forming the phase correction comprises representing the mixed signals according to absolute value and phase and determining a difference in phase between a second mixed signal and a first mixed signal for each sample.

4. The method of claim 3, wherein differences in phase for each sample form a phase correction function; and
wherein phase correction function is applied to a sampled time signal to correct the sampled time signal.

5. The method of claim 1, wherein the signals are linear frequency-modulated signals.

6. The method of claim 1, wherein the at least two transceiver units are in line-of-sight with one another.

7. The method of claim 1, wherein the at least two transceiver units are configured for earth remote sensing.

8. The method of claim 1, wherein the at least two transceiver units are attached to separate flying objects.

9. The method of claim 1, further comprising estimating a phase error using baseband signals of at least one receiving channel and compensating for the phase error in at least one further receiving channel.

10. The method of claim 1, wherein at least one transceiver unit amongst that at least two transceiver units uses an antenna element for both transmitting and receiving.

11. A radar system comprising:
at least two transceiver units that are spatially separated and configured to transmit and receive signals simultaneously or overlapping in time; and
at least one evaluation unit configured to:
form respective comparison signals comprising mixed signals respectively formed from a signal transmitted and received by a respective transceiver unit amongst the at least two transceiver units;
form a phase correction for each of a plurality of time sample values from the mixed signals to generate a measure of a phase difference per time sample value between the mixed signals from the at least two transceiver units; and use the phase correction to improve accuracy of at least one of a distance measurement or a velocity measurement between the at least two transceiver units.

12. The radar system of claim 11, wherein the at least one evaluation unit is configured to form the phase correction by multiplying one mixed signal with a complex-valued conjugate of another mixed signal.

13. The radar system of claim 11, wherein the at least one evaluation unit is configured to form the phase correction by representing the mixed signals according to absolute value and phase and determining a difference in phase between a second mixed signal and a first mixed signal for each sample.

14. The radar system of claim 11, wherein differences in phase for each sample form a phase correction function; and
wherein the at least one evaluation unit is configured to apply the phase correction function to a sampled time signal to correct the sampled time signal.

15. The radar system of claim 11, wherein the signals are linear frequency-modulated signals.

16. The radar system of claim 11, wherein the at least two transceiver units are in line-of-sight with one another.

17. The radar system of claim 11, wherein the at least two transceiver units are configured for earth remote sensing.

18. The radar system of claim 11, wherein the at least two transceiver units are attached to separate flying objects.

19. The radar system of claim 11, wherein the at least one evaluation unit is configured to estimate a phase error using baseband signals of at least one receiving channel and compensate for the phase error in at least one further receiving channel.

20. The radar system of claim 11, wherein at least one transceiver unit amongst that at least two transceiver units uses an antenna element for both transmitting and receiving.

* * * * *

UNITED STATES PATENT AND TRADEMARK OFFICE
CERTIFICATE OF CORRECTION

| | | |
|---|---|---|
| PATENT NO. | : 12,222,436 B2 | Page 1 of 1 |
| APPLICATION NO. | : 17/641729 | |
| DATED | : February 11, 2025 | |
| INVENTOR(S) | : Gulden et al. | |

It is certified that error appears in the above-identified patent and that said Letters Patent is hereby corrected as shown below:

In the Claims

In Column 12, Line 9, in Claim 1, after "comprising:", insert a linebreak

In Column 12, Line 11, in Claim 1, after "that", insert --are--

Signed and Sealed this
Second Day of September, 2025

Coke Morgan Stewart
*Acting Director of the United States Patent and Trademark Office*